United States Patent [19]

Buetemeister

[11] 4,291,586
[45] Sep. 29, 1981

[54] SHIFT CONTROL MECHANISM FOR A COUNTERSHAFT TRANSMISSION

[75] Inventor: Earl H. Buetemeister, Alexandria, Ind.

[73] Assignee: General Motors Corporation, Detroit, Mich.

[21] Appl. No.: 122,471

[22] Filed: Feb. 19, 1980

[51] Int. Cl.³ .................... B60K 20/10; B60K 20/12; F16H 1/18; F16H 1/20
[52] U.S. Cl. .................................. 74/335; 74/89.15; 74/424.8 R; 74/473 R
[58] Field of Search ............... 74/89.15, 424.8 R, 335, 74/473 R, 483 PB, 826

[56] References Cited

U.S. PATENT DOCUMENTS

| 2,235,943 | 3/1941 | Mylius | 74/483 PB |
|---|---|---|---|
| 2,637,222 | 5/1953 | Backus | 74/335 X |
| 2,649,813 | 8/1953 | Barth et al. | 74/335 |
| 2,881,625 | 4/1959 | Hodkin | 74/336.5 |
| 3,110,191 | 11/1963 | Schulze | 74/333 |
| 3,192,788 | 7/1965 | Fodrea | 74/333 X |
| 3,277,734 | 10/1966 | Bernard | 74/335 |

FOREIGN PATENT DOCUMENTS

| 1450891 | 5/1969 | Fed. Rep. of Germany | 74/335 |
|---|---|---|---|
| 829666 | 7/1938 | France | 74/424.8 R |
| 45-15321 | 5/1970 | Japan | 74/335 |
| 267094 | 5/1928 | United Kingdom | 74/424.8 R |
| 1441079 | 6/1976 | United Kingdom | 74/473 R |

Primary Examiner—Leslie Braun
Attorney, Agent, or Firm—Donald F. Scherer

[57] ABSTRACT

A shift control for a countershaft transmission has an electric motor drive. The output of the electric motor is connected to the screw portion of a barrel-nut and screw actuator. The barrel-nut is selectively grounded or rotated so that the motion of the shift control output member is linear or rotary, respectively. The motion of the output member of the shift control describes an "H" or modified "H" shift pattern and is adapted to be connected to control the gear changing mechanism in a countershaft transmission.

3 Claims, 3 Drawing Figures

SHIFT CONTROL MECHANISM FOR A COUNTERSHAFT TRANSMISSION

This invention relates to transmission shift controls and more particularly to shift controls for countershaft transmissions.

It is an object of this invention to provide an improved shift control mechanism for a countershaft transmission wherein the control mechanism has a rotating input member which is drivingly connected through a threaded connection and a transfer gear mechanism to control the motion of the output member in a conventional "H" or modified "H" shift pattern.

It is another object of this invention to provide an improved shift control mechanism for a countershaft transmission wherein the input member of the shift control mechanism is driven by an electric motor and wherein the output member of the shift control mechanism is drivingly connected to the input member through a threaded connection and a transfer gear connection such that the output member can be rotated in unison with the input member or upon grounding of the transfer gear, the output member can be moved linearly relative to the output member whereby an "H" pattern or a modified "H" pattern is described by the motion of the output member.

These and other objects and advantages of the present invention will be more apparent from the following description and drawings in which.

Figure 1:
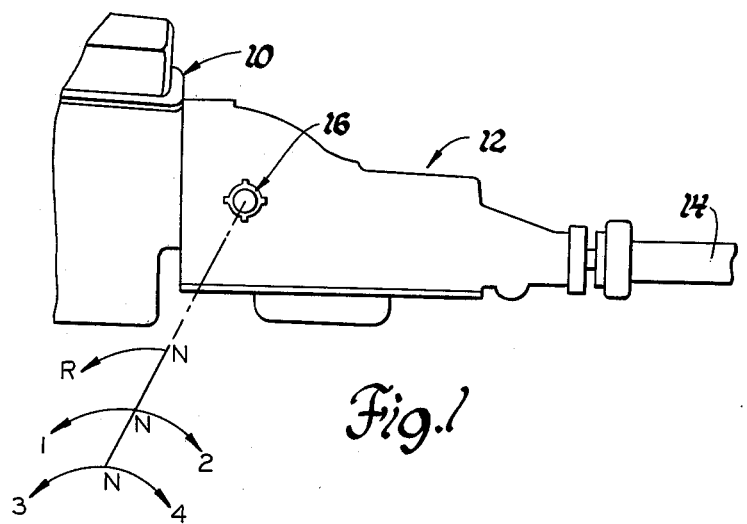
FIG. 1 is a side elevational view of a transmission incorporating the present invention.

Referring to the drawings, wherein like characters represent the same or corresponding parts throughout the several views, there is seen in FIG. 1 a drive system consisting of an internal combustion engine 10, a multi-speed transmission 12 and a drive shaft 14. The multi-speed transmission 12 is a countershaft type transmission, preferably of the four-speed variety. This transmission may be constructed in accordance with the transmission shown in U.S. Pat. No. 3,192,788 issued July 6, 1965 or U.S. Pat. No. 3,110,191 issued Nov. 12, 1963.

Figure 2:
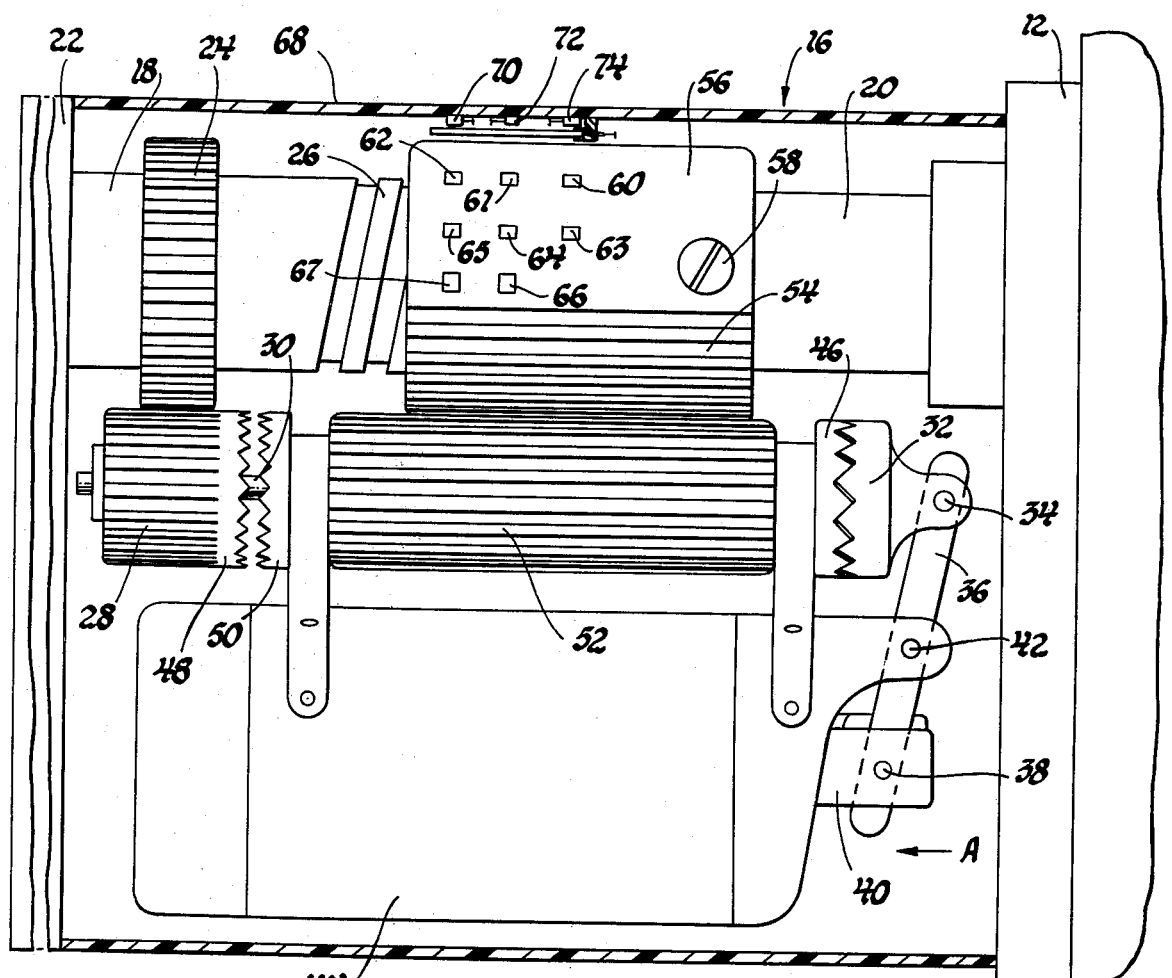
FIG. 2 is a side elevational view of the shift control mechanism used with the present invention.

Secured to the transmission 12 is a shift control mechanism 16, which is seen in greater detail in FIG. 2. The shift control mechanism 16 is operable to provide the shift pattern shown diagrammatically in FIG. 1. When used with a four-speed transmission, this shift pattern is commonly referred to as a modified "H" pattern. As can be seen from the diagram, the four forward speeds are in a conventional "H" pattern with each of the forward speed ratios being at a respective end of the upstanding legs of the "H" and neutral being along the crossbar of the "H". When used with a four-speed arrangement, the neutral position is extended along a line coincident with a crossbar to permit a reverse gear ratio to be attained through movement parallel to the upstanding members of the "H" pattern.

As seen in FIG. 2, the shift control mechanism 16 has an input shaft 18 and an output member 20. The input shaft 18 is driven by a conventional electric motor shown diagrammatically at 22. The output member 20 is connected to a conventional shifter fork mechanism disposed within the transmission 12. The shifter fork mechanism may be constructed in accordance with the mechanism as shown in the above-mentioned U.S. Pat. Nos. 3,192,788 and 3,110,191.

The input shaft 18 has connected thereto an input gear 24 and has integrally formed thereon a screw thread 26. The input gear 24 meshes with a transfer gear 28 which is rotatably supported on a shaft 30. The shaft 30 is secured at one end to a jaw clutch member 32. The jaw clutch member 32 is pivotally connected through pin 34 to a lever 36, which lever 36 is also pivotally connected at pin 38 to a solenoid output member 40. The lever 36 is also pivotally connected at its center position through a pin 42.

The solenoid member 40 is a component of a conventional electrically-operated solenoid 44. As is well-known with electric solenoids, when the coil therein is energized, the output member will move linearly. As the output member 40 is moved linearly, in the direction of Arrow A, the jaw clutch member 32 will become disengaged from a jaw clutch member 46. Subsequent to the disengagement of jaw clutch members 32 and 46, jaw clutch members 48 and 50 will become engaged. The jaw clutch member 48 is integral with the transfer gear 28, while the jaw clutch member 50 and the jaw clutch member 46 are both integral with a transfer gear or spline member 52.

When the solenoid output member 40 is moved to a direction opposite to Arrow A, the jaw clutch members 32 and 46 will be engaged and the jaw clutch members 48 and 50 will be disengaged. When the jaw clutch members 32 and 46 are engaged, the transfer gear 52 will be stationary. When the jaw clutch members 48 and 50 are engaged, the transfer gear 52 will rotate in unison with the transfer gear 28.

The transfer gear 52 meshes with an output gear or spline member 54, which is formed on the outer surface of a conventional barrel-nut 56. The internal portion of the barrel-nut 56 is threadably engaged with the thread 26. The barrel-nut 56 is secured by a fastener 58 to the output member 20. There are embedded in the outer surface of the barrel-nut 56, eight magnets 60 through 67.

The shift control mechanism 16 includes a housing 68 which extends between the electric motor 22 and the transmission 12. The housing 68 encloses the operating mechanism of the shift control mechanism 16. Secured to the inner surface of the housing 68 is a plurality of magnetically operated conventional reed switches such as 70, 72 and 74. The magnetic reed switches are selectively alignable with and actuated by the magnets 60 through 67 such that the position of the barrel-nut 56 and therefore output member 20 can be determined electrically. The electrical connections made by the reed switches transmit this information to a conventional microprocessor, such as that shown diagrammatically at 76 in FIG. 3.

Figure 3:
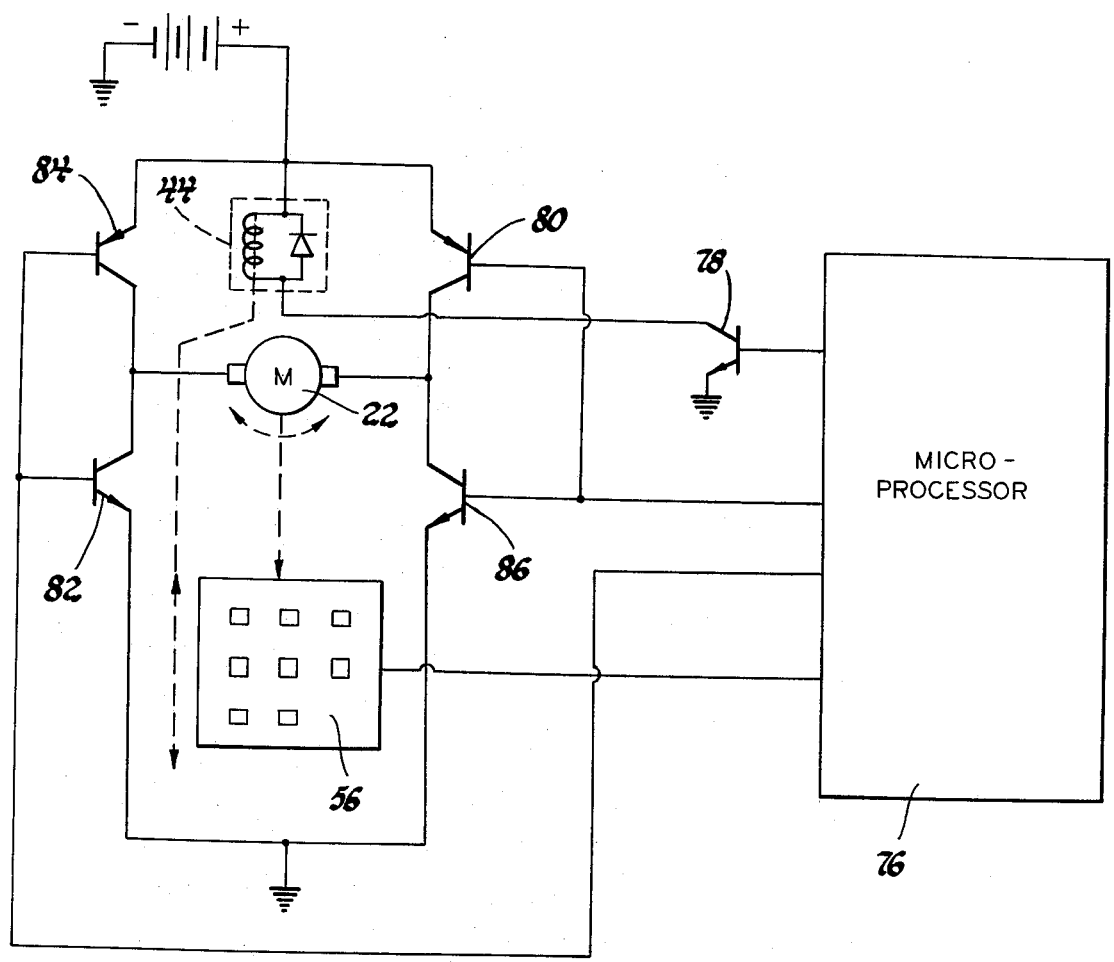
FIG. 3 is a schematic diagram representing an electrical control system for use with the present invention.

As seen in FIG. 3, the microprocessor 76 operates to control a transistor or switch member 78 which is operable to control the solenoid 44. The microprocessor 76 is also operable to control the direction of rotation of the motor 22. The electric motor 22 is rotated in a clockwise direction by providing electrical conductivity through transistors 80 and 82 and is operated in a counterclockwise direction by providing electrical conductivity in transistors 84 and 86. The transistors shown schematically in FIG. 3 are conventional devices such that a further description thereof is not considered necessary. Those persons acquainted with the use of microprocessors in providing control functions will be readily able to provide a substantially conventional system for the present control mechanism 16.

The control system will cause the rotation of electric motor 22 as required to provide the desired shift maneuver. Assuming that the transmission shift control has the transmission conditioned for neutral, and in particular is conditioned for neutral between the first and second gear ratios, and further assuming that the operator has requested a shift to the first gear ratio, the following will occur. The microprocessor 76 will recognize through the appropriate "reading" of the reed switches that the output member 20 is at neutral between first and second ratios. The microprocessor will recognize that the output member 20 must be rotated counterclockwise and will therefore actuate the electrical circuit such that transistors 84 and 86 will be conductive and the electric motor 22 will operate in a counterclockwise direction. Upon reaching the first gear position, the appropriate reed switches in combination with the magnets on barrel-nut 56 will signal the electrical system that the shift has been completed.

If the operator desires or requests a gear change from first to second, the electrical control will recognize that the output member 20 has to be rotated clockwise and will provide the signals to accomplish this rotation. When the proper reed switches and magnets are aligned, the electrical control system will recognize that second gear has been obtained and will cease operation of the control mechanism 16.

When the operator requests a gear change from second to third, the electrical control will first, rotate the output member counterclockwise to the neutral position; second, operate solenoid 44 such that the transfer gear 52 will remain stationary whereupon rotation of the input shaft 18 will result in linear motion of the output member 20 due to the threaded connection therebetween; third, the microprocessor will recognize that the shift control has reached the neutral position between ratios three and four and signal the solenoid to disengage members 32 and 46 while engaging members 48 and 50; and fourth, the electrical control will signal the electric motor 22 to rotate in a counterclockwise direction until the third gear position is achieved at which time the electric motor 22 will be stopped.

Manipulation of the output member 20 to the various drive positions can be readily ascertained by those skilled in the art. It is not believed that a lengthy description of the operation which permits the output member 20 to be moved to the various locations is necessary.

The number of reed switches and magnets which will be utilized to provide the desired control function can be determined by the electrical circuit designer. It will be appreciated that as many as eight magnets and eight switches can be utilized for a four-speed and reverse control. It should also be appreciated that as few as three magnets and four switches, or vice versa, can be utilized. The choice as to the number and positioning is within the purview of the circuit designer and is not necessary for a complete understanding of the present invention. What is important and what should be recognized is the fact that the output member 20 will selectively have linear motion or rotary motion while the input shaft 18 has rotary motion only. By engaging clutch members 32 and 46, the barrel-nut 56 is prevented from rotating such that it will translate along screw thread 26 when the input shaft 18 is rotated. Thus, the output member 20 will move linearly. When the clutch members 48 and 50 are engaged, the barrel-nut 56 will rotate in unison with input shaft 18 through the drive connection provided by the input gear 24, the transfer gears 28 and 52 and the output gear 54. Since the barrel-nut 56 and screw thread 26 are rotating in unison, the motion of the output member 20 will be rotary only. Through judicious control of the linear and rotary motion of output member 20, it should be appreciated that an "H" pattern or a modified "H" pattern is obtained. This permits the use of the subject transmission shift control mechanism to be utilized with conventional countershaft transmissions which utilize a conventional "H" or modified "H" pattern.

The embodiments of the invention in which an exclusive property or privilege is claimed are defined as follows:

1. A control mechanism for a countershaft transmission shift control wherein the basic shift pattern is in the form of an "H" or a modified "H", said control mechanism comprising; a source of rotary input motion including an input shaft having an input gear member and a screw threaded portion; an output member including a nut threaded portion threadably drivingly connected to said screw threaded portion and an output gear member; first and second transfer gear means meshing with said input and output gear members respectively; and control means including a pair of selectively operated solenoid controlled jaw clutch assemblies for respectively connecting said first and second transfer gear means for unitary rotation and holding said second transfer gear means stationary, said output member moving linearly along the threaded connection to form the cross member of the shift control "H" pattern when said second transfer gear means is held stationary and said output member being rotated in unison with said input member to form the upstanding legs of the shift control "H" pattern when the first and second transfer gear means are rotated in unison.

2. A control mechanism for a countershaft transmission shift control wherein the basic shift pattern is in the form of an "H" or a modified "H", said control mechanism comprising; a source of rotary input motion including an input gear member and an input threaded member; an output member including an output threaded member threadably drivingly connected to said input threaded member and an output gear member; first and second transfer gear means meshing with said input and output gear members respectively; and control means including a first clutch assembly for selectively connecting said first and second transfer gear means for unitary rotation, a second clutch assembly for selectively holding said second transfer gear means stationary and solenoid means for operating the first and second clutch assemblies, said output member moving linearly along the threaded connection to form the cross member of the shift control "H" pattern when said second clutch assembly is operated and said output member being rotated in unison with said input member to form the upstanding legs of the shift control "H" pattern when said first clutch assembly is operated.

3. A control mechanism for a countershaft transmission shift control wherein the basic shift pattern is in the form of an "H" or a modified "H", said control mechanism comprising; a source of rotary input motion including an input gear member and an input threaded member; an output member including an output threaded member threadably drivingly connected to said input threaded member and an output gear member; first and second transfer gear means meshing with said input and output gear members respectively; and control means for selectively connecting said first and second transfer gear means for unitary rotation and for alternatively holding said second transfer gear means stationary, said output member moving linearly along the threaded connection to form the cross member of the shift control "H" pattern when said second transfer gear means is held stationary and said output member being rotated in unison with said input member to form the upstanding legs of the shift control "H" pattern when the first and second transfer gear means are rotated in unison.

* * * * *